United States Patent
Croteau et al.

(10) Patent No.: US 6,550,342 B2
(45) Date of Patent: Apr. 22, 2003

(54) CIRCUMFERENTIAL STRAIN ATTENUATOR

(75) Inventors: Paul F. Croteau, Columbia, CT (US); Daniel L. Gysling, Glastonbury, CT (US); James M. Diener, Niantic, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 217 days.

(21) Appl. No.: 09/726,061

(22) Filed: Nov. 29, 2000

(65) Prior Publication Data

US 2002/0064330 A1 May 30, 2002

(51) Int. Cl.$^7$ ............................................... G01L 1/24
(52) U.S. Cl. ..................................................... 73/800
(58) Field of Search ................ 385/12, 13; 250/227.14; 356/32; 73/152.01, 152.43, 152.54, 800, 855, 856

(56) References Cited

U.S. PATENT DOCUMENTS

| | | | |
|---|---|---|---|
| 3,149,492 A | 9/1964 | Weinberg | 73/393 |
| 4,080,837 A | 3/1978 | Alexander et al. | 73/61 R |
| 4,445,389 A | 5/1984 | Potzick et al. | 73/861.27 |
| 4,515,473 A | 5/1985 | Mermelstein | 356/33 |
| 4,519,869 A * | 5/1985 | Gill et al. | 156/428 |
| 4,520,320 A | 5/1985 | Potzick et al. | 328/133 |
| 4,706,501 A | 11/1987 | Atkinson et al. | 73/730 |
| 4,976,151 A | 12/1990 | Morishita | 73/730 |
| 5,024,099 A | 6/1991 | Lee | 73/730 |
| 5,031,460 A | 7/1991 | Kanenobu et al. | 73/730 |
| 5,040,415 A | 8/1991 | Barkhoudarian | 73/198 |
| 5,083,452 A | 1/1992 | Hope | 73/61 R |
| 5,218,197 A | 6/1993 | Carroll | 250/227.19 |
| 5,363,342 A | 11/1994 | Layton et al. | 367/149 |
| 5,398,542 A | 3/1995 | Vasbinder | 73/40.5 |
| 5,440,932 A | 8/1995 | Wareham | 73/730 |
| 5,591,922 A | 1/1997 | Segeral et al. | 73/861.04 |
| 5,670,720 A | 9/1997 | Clark et al. | 73/730 |
| 5,741,980 A | 4/1998 | Hill et al. | 73/861.04 |
| 5,845,033 A | 12/1998 | Berthold et al. | 385/12 |
| 6,009,610 A * | 1/2000 | Brandolf | 29/402.03 |
| 6,233,374 B1 * | 5/2001 | Ogle et al. | 385/13 |

FOREIGN PATENT DOCUMENTS

| EP | 0 388 316 A2 | 9/1990 | G01V/1/40 |
|---|---|---|---|
| GB | WO 0000793 A | 1/2000 | G01F/1/74 |

OTHER PUBLICATIONS

"Noise and Vibration Control Engineering Principles and Applications", Leo L. Beranek and Istvan L. Ver, A Wiley Interscience Publication, pp. 537–541.
"Mandrel–Wound Fiber Optic Pressure Sensor", P. Ogle, D. Gysling and A. Kersey, Docket CC–0033, pp. 1–22.
CiDRA Presentation on "Flow Meter", Dec. 7–18, 1998, Houston, TX.
"Sound and Sources of Sound", by A. P. Dowling and J. E. Williams, pp. 224–229.
International Search Report dated Mar. 11, 2002 for corresponding application PCT/GB01/05277.

* cited by examiner

Primary Examiner—Max Noori
(74) Attorney, Agent, or Firm—Howrey Simon Arnold & White, LLP (57) ABSTRACT

An apparatus for varying the gain of a fiber optic sensor that non-intrusively senses the strain response of a pipe is provided. The apparatus includes a circumferential strain attenuator that has an annular land portion that mechanically couples the attenuator to the pipe. An annular web extends coaxially from the land portion and has a reduced cross sectional area relative to the land, and an annular mandrel portion extends coaxially from the web portion and forms a gap between the pipe and the mandrel. The fiber optic sensor is wound on the circumferential strain attenuator. The web and mandrel cooperate to reduce the strain response of the fiber optic sensor relative to the strain response of the pipe.

42 Claims, 7 Drawing Sheets

CIRCUMFERENTIAL STRAIN ATTENUATOR

BACKGROUND OF THE INVENTION

1. Technical Field

This invention relates to fluid flow sensing devices that use fiber optics and more particularly to those devices that measure the speed of sound, flow velocity, and other parameters within a pipe using acoustic signals and local short duration pressure variations within the flow.

2. Background Information

In the petroleum industry, there is considerable value in the ability to monitor the flow of petroleum products in the production pipe of a well in real time. Historically, flow parameters such as the bulk velocity of a fluid have been sensed with venturi type devices directly disposed within the fluid flow. These type devices have several drawbacks including that they provide an undesirable flow impediment, are subject to the hostile environment within the pipe, and typically provide undesirable potential leak paths into or out of the pipe. In addition, these type devices are also only able to provide information relating to the bulk fluid flow and are therefore unable to provide information specific to constituents within a multi-phase flow.

Some techniques utilize the speed of sound to determine various parameters of the fluid flow within a pipe. One technique measures the amount of time it takes for sound signals to travel back and forth between ultrasonic acoustic transmitters/receivers (transceivers). This is sometimes referred to as a "sing-around" or "transit time" method. U.S. Pat. Nos. 4,080,837, 4,114,439, 5,115,670 disclose variations of this method. A disadvantage of this type of technique is that gas bubbles and/or particulates in the fluid flow can interfere with the signals traveling back and forth between the transceivers. Another disadvantage of this type of technique is that it considers only the fluid disposed between transceivers during the signal transit time. Fluid flow within a well will very often be non-homogeneous, for example containing localized concentration variations ("slugs") of water or oil. Localized concentration variations can affect the accuracy of the data collected.

Multiphase flow meters can be used to measure the flow rates of individual constituents within a fluid flow (e.g., a mixture of oil, gas, and water) without requiring separation of the constituents. Most of the multiphase flow meters that are currently available, however, are designed for use at the wellhead or platform. A problem with utilizing a flow meter at the wellhead of a multiple source well is that the fluid flow reaching the flow meter is a mixture of the fluids from the various sources disposed at different positions within the well. Thus, although the multiphase meter provides information specific to individual constituents within a fluid flow (which is an improvement over a bulk flow sensors), the information they provide is still limited because there is no way to distinguish sources.

Acquiring reliable, accurate fluid flow data downhole at a particular source environment is a technical challenge for at least the following reasons. First, fluid flow within a production pipe is hostile in direct contact with the fluid flow, and can cause the sensors to erode, corrode, wear, or otherwise compromise their integrity. In addition, the hole or port in the pipe through which the sensor makes direct contact, or through which a cable is run, is a potential leak site, which is highly undesirable. Second, the environment in most wells is harsh, and is characterized by extreme temperatures, pressures, and debris. Extreme temperatures can disable and limit the life of electronic components. Sensors disposed outside of the production pipe may also be subject to environmental constituents such as water (fresh or salt), steam, mud, sand, etc. Third, the well environment makes it difficult and expensive to access most sensors once they have been installed and positioned downhole.

What is needed, therefore, is a reliable, accurate, and compact apparatus for sensing fluid flow within a pipe that can sense fluid flow within a pipe in a non-intrusive manner over a broad range of conditions, that is operable in an environment characterized by extreme temperatures and pressures and the presence of debris, that can operate remotely, and that is not likely to need replacement or recalibration once installed. Such are the objects of the present disclosure.

SUMMARY OF THE INVENTION

An apparatus for varying the gain of a fiber optic sensor that non-intrusively senses the strain response of a pipe is provided. The apparatus includes a circumferential strain attenuator that has an annular land portion that mechanically couples the attenuator to the pipe. An annular web extends coaxially from the land portion and has a reduced cross sectional area relative to the land, and an annular mandrel portion extends coaxially from the web portion and forms a gap between the pipe and the mandrel. The fiber optic sensor is wound on the circumferential strain attenuator. The web and mandrel cooperate to reduce the strain response of the fiber optic sensor relative to the strain response of the pipe.

The design of fiber optic flowmeters are constrained by, among other things, the structural compliance of the pipe, optical timing issues for a given length of fiber, and slew rate limitations based on the rate of change of the length of the fiber sensors. It is often desirable to select a fiber length per sensor and sensor spacing that provides an optimum level of gain for the full range of acoustics to be detected, and with regard to the fluid type, fluid consistency, and the anticipated flow rate of the fluid within the pipe. An advantage of the present invention is that it provides the ability to selectively modify, or otherwise attenuate, the gain of a flowmeter while keeping other constraints constant. The present invention results in a flowmeter having a fixed fiber length with the capability to measure a wide range of pressure levels in various acoustic environments. It will be appreciated by those skilled in the art that the environment surrounding a flowmeter may produce too much acoustic energy and thereby overtax the highly sensitive fiber optic sensors. Such environments are those that include pumps, venturis, choke valves, or any other sources that causes noise orders of magnitude above that of normal pipe flow.

The present invention also includes a compliant material positioned between the circumferential strain attenuator and the pipe. As a result the relatively high natural frequencies of the device that might otherwise cause a signal-processing problem are dampened out.

The foregoing and other objects, features, and advantages of the present invention will become more apparent in light of the following detailed description of exemplary embodiments thereof.

DETAILED DESCRIPTION OF THE INVENTION

Figure 1:
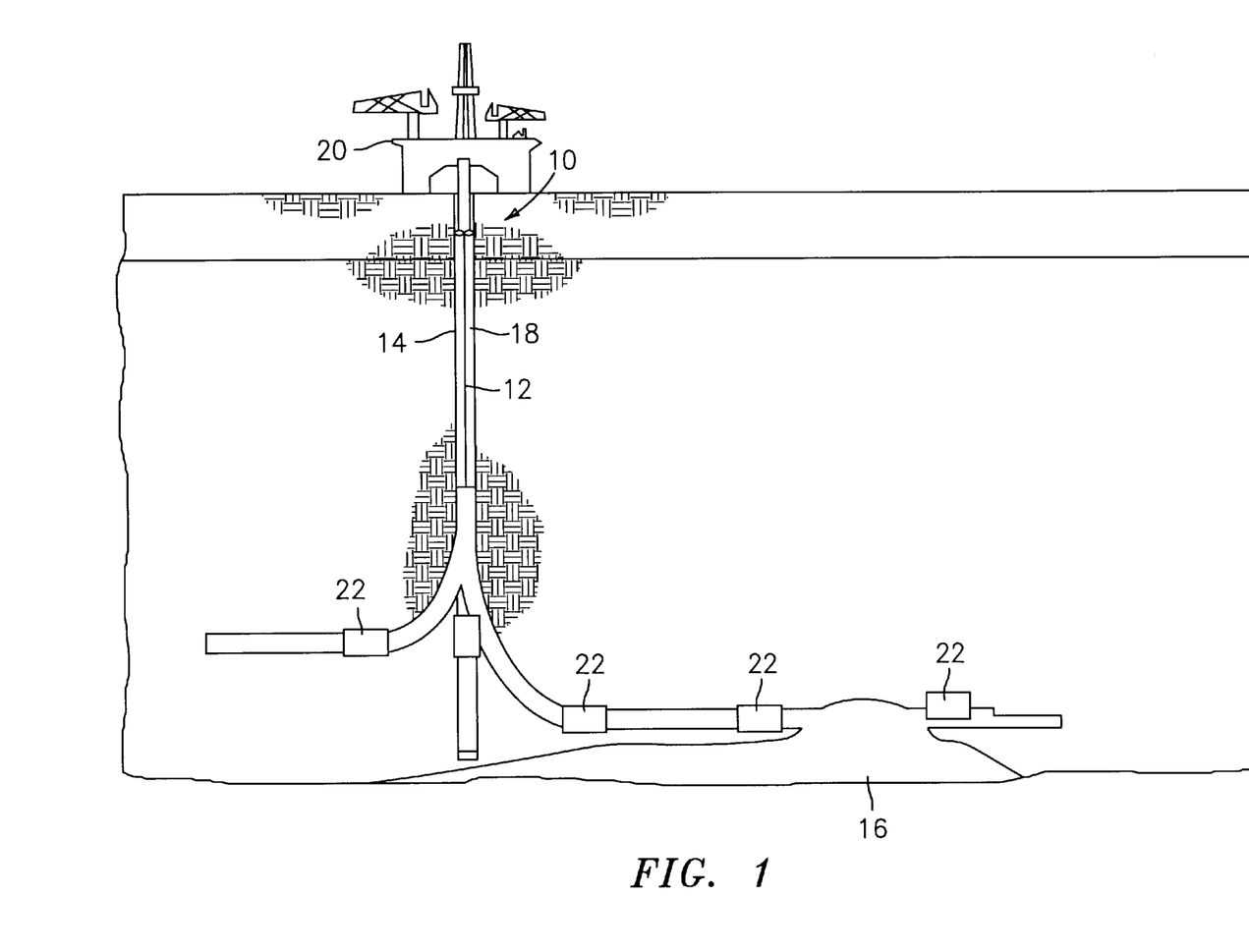
FIG. 1 is a diagrammatic view of a well having a casing and a pipe, and with flow meters positioned at various locations along the pipe inside the casing.

Referring to FIG. 1, there is shown an intelligent oil well system 10 containing one or more production pipes 12 that extend downward through a casing 14 to one or more petroleum sources 16. An annulus 18 is formed between the pipe 12 and the casing 14. Each production pipe 12 may include one or more lateral sections that branch off to access different petroleum sources 16 or different areas of the same petroleum source 16. Fluid mixtures, consisting mostly of petroleum products and water, flow from the sources 16 to the platform 20 through the production pipes 12. The production pipe 12 includes one or more the present invention apparatus 22 for non-intrusively sensing fluid flow within a pipe (also referred to hereinafter as a "flow meter") to monitor various physical parameters of the fluid mixtures as they flow through the production pipes 12.

Figure 2:
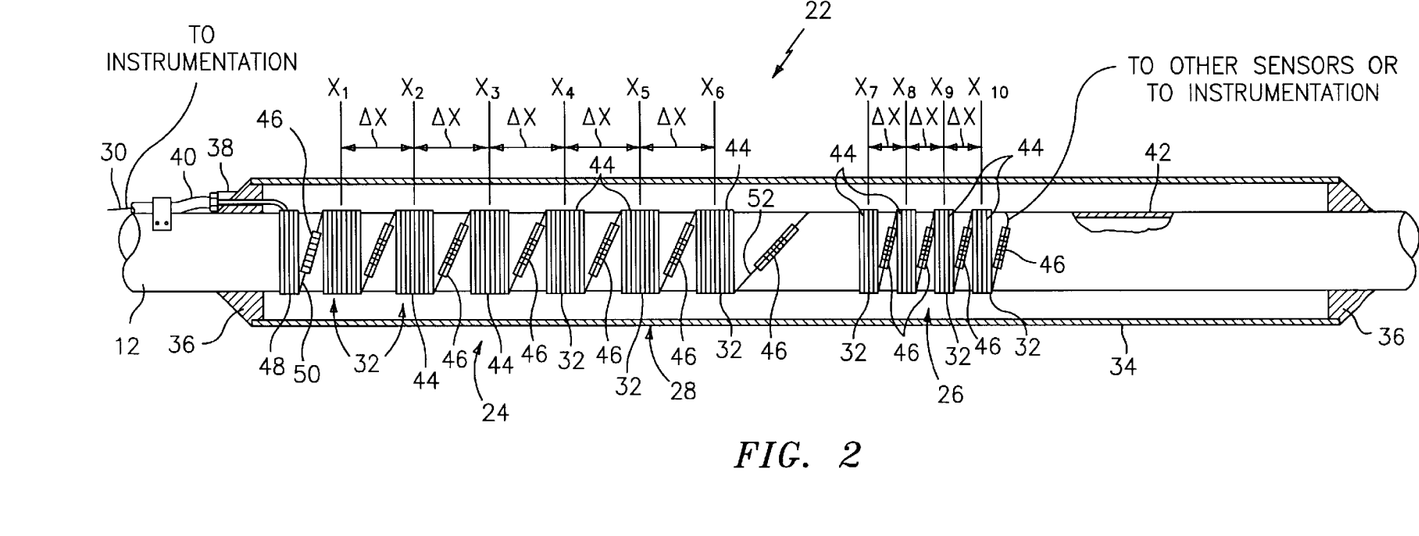
FIG. 2 is a diagrammatic view of an apparatus for non-intrusively measuring fluid flow parameters within a pipe.

Referring to FIG. 2, the present invention flow meter 22 includes a first sensing array 24 for sensing acoustic signals traveling at the speed of sound (SOS) through the fluid within the pipe 12 (hereinafter also referred to as the "SOS sensing array"), a second sensing array 26 for sensing short duration local pressure variations traveling with the fluid flow within the pipe 12 (hereinafter also referred to as the "flow velocity sensing array"), and a housing 28 attached to the pipe 12 for enclosing the sensing arrays 24, 26. Each flow meter 22 can be incorporated into an existing section of production pipe 12, or can be incorporated into a specific pipe section that is inserted in line into the production pipe 12. The distributed scheme of flow meters 22 shown in FIG. 1 permits an operator of the intelligent well system 10 to determine the extent and location of breakthrough of water into the petroleum reserve. The availability of this type of information permits the user to monitor and intelligently control the production of the petroleum reserve.

The sensing arrays 24, 26 receive optical power and produce optical signals via fiber optic cables 30 that extend between the flow meter 22 and instrumentation residing on the platform 20 or at a remote location in communication with the platform 20. Such instrumentation can include, but is not limited to, that disclosed in U.S. patent application Ser. No. 09/726,059, entitled "Method and Apparatus for Interrogating Fiber Optic Sensors," filed Nov. 29, 2000, which is hereby incorporated by reference.

Optical fiber pressure sensors 32 within each sensing array 24, 26 may be connected individually to the platform instrumentation, or may be multiplexed along one or more optical fibers using known techniques including, but not limited to, wavelength division multiplexing (WDM) and time division multiplexing (TDM). In those embodiments where the optical fiber pressure sensors 32 are not connected individually to the instrumentation, the sensors 32 of a sensing array 24, 26 may be connected to one another in series or parallel.

The optical signals produced by the sensing arrays 24, 26 provide information relating to the fluid flow characteristics within the pipe 12 (e.g., local flow disturbances, acoustic wave propagation within the flow, flow pressure magnitude and changes, etc.). Interpretation of the optical signals, which can be accomplished using methods well known in the art, enables the determination of the speed of sound (SOS) of the fluid mixture and the velocity of the fluid flow within the pipe 12. Once the SOS, the flow velocity, the pressure, and the temperature of the mixture are known, other desirable data such as the phase fraction of the constituents within the mixture can be determined. The optical signals from the sensing arrays 24, 26 may also be interpreted using the methods disclosed in the following U.S. Patent applications, but are not limited to being used therewith: U.S. patent application Ser. No. 09/105,534, entitled "Fluid Parameter Measurement in Pipes Using Acoustic Pressures," filed Jun. 26, 1998; Ser. No. 09/332,070, entitled "Measurement of Propagating Acoustic Waves in Compliant Pipes," filed Jun. 25, 1999; Ser. No. 09/332,069, entitled "Displacement Based Pressure Sensor Measuring Unsteady Pressure in a Pipe," filed Jun. 25, 1999; Ser. No. 09/332,094, entitled "Fluid Parameter Measurement in Pipes Using Acoustic Pressures," filed Jun. 25, 1999; and Ser. No. 09/332,093, entitled "Non-Intrusive Fiber Optic Pressure Sensor for Measuring Unsteady Pressures Within a Pipe," filed Jun. 25, 1999, all of which are hereby incorporated by reference.

Figure 3:
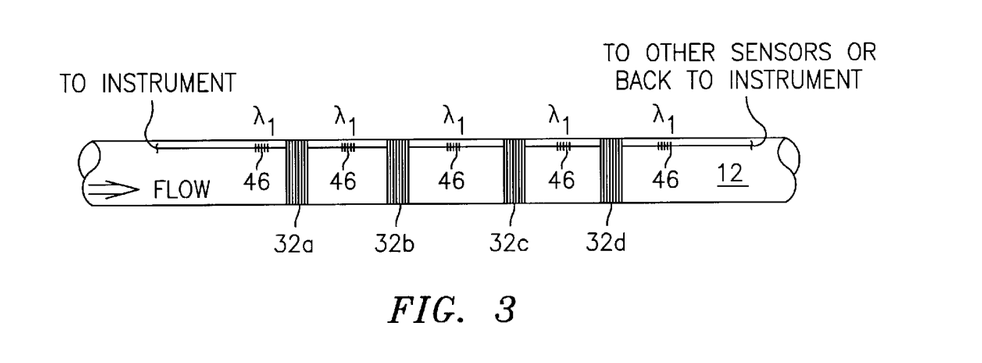
FIG. 3 is a diagrammatic view of an embodiment of a sensing device.
Figure 4:
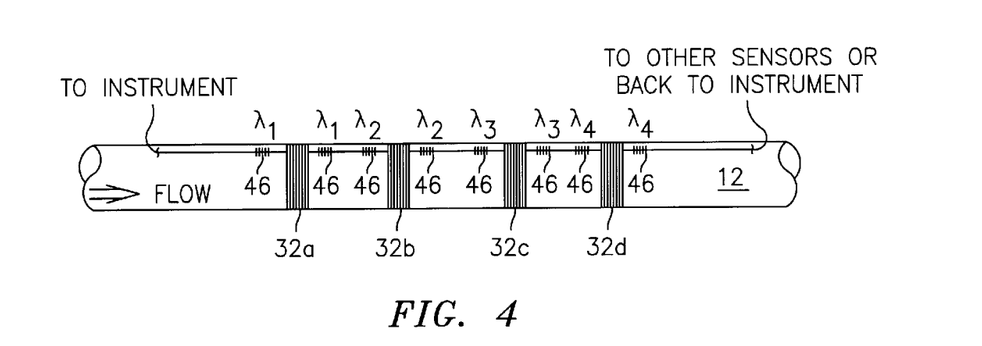
FIG. 4 is a diagrammatic view of an embodiment of a sensing device.
Figure 5:
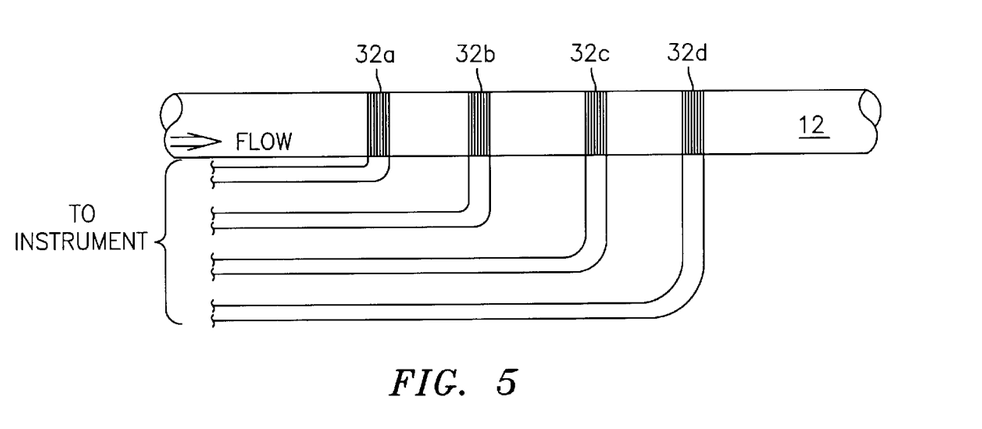
FIG. 5 is a diagrammatic view of an embodiment of a sensing device.

FIG. 2 shows an exemplary embodiment of the present invention wherein the SOS sensing array 24 and the flow velocity sensing array 26 are positioned adjacent one another on a common length of pipe 12. Further details of this embodiment are provided below. FIGS. 3–5 diagrammatically illustrate sensing array embodiments and configurations that can be used with either or both sensing arrays 24, 26.

To avoid interference from outside sources and to protect from the harsh environment within the well, the sensing arrays 24, 26 are enclosed within a housing 28 that is attached to an exterior surface of the pipe section 12. The housing 28 includes an outer sleeve 34 extending between a pair of bosses 36. The fiber optic cable(s) 30 that extends between the flow meter 22 and the instrumentation passes through a sealable port 38 in one or both bosses 36 and connects with the sensing arrays 24, 26. Outside the housing 28, the sensor cable 30 is housed in a protective conduit 40 that is attached to the pipe 12. In the preferred embodiment, the housing 28 and the pipe 12 together form a pressure vessel. The pressure within the pressure vessel may be greater than or less than the ambient pressure within the annulus 18 between the casing 14 and the pipe 12. In other embodiments, the housing 28 is sealed to protect the sensing arrays 24, 26, but does not act as a pressure vessel. In all embodiments, the size and structure of the housing 28 are chosen to withstand the pressure gradients present in the well environment, to accommodate the size of the sensing arrays 24, 26, and to allow the sensing arrays 24, 26 to be positioned a distance away from the housing 28 such that heat transfer via the pipe 12 and/or the housing 28 is not deleterious for the application at hand. In a preferred embodiment, the housing 28 is filled with a gas such as, but not limited to, air, nitrogen, argon, etc. The gaseous environment within the housing 28 advantageously acts as an acoustic isolator that helps reduce pressure wave interference that might otherwise travel into the housing 28 from the annulus 18 and undesirably influence the sensing arrays 24, 26. The gaseous environment also thermally insulates the sensing arrays 24,26.

In some applications, there is advantage in placing a plurality of bumpers within the housing to help maintain separation between the outer sleeve of the housing and the pipe. U.S. patent application Ser. No. 09/740,757, entitled "Apparatus for Protecting Sensors Within a Well Environment," filed Nov. 29, 2000, discloses bumpers that can be used in this manner and is hereby incorporated by reference.

The pipe section 12 has a compliancy selected to suit the application at hand. The pipe 12 must have sufficient structural integrity to handle the pressure gradient across the pipe 12, and yet must also be able to deflect (i.e., change in circumference) to a degree that will yield useful information. The amount the pipe 12 will change in circumference for a given pressure distribution is determined by the thickness of the pipe wall 42 and the physical properties of the pipe material (e.g., modulus of elasticity, etc.). Thus, the thickness of the pipe wall 42 and the pipe material can be chosen to help produce a favorable sensor sensitivity for the present apparatus. The characteristics of the pipe section 12 useable with the disclosed sensor arrays may be the same as or different than the characteristics in other sections of the production pipe 12.

The optical pressure sensors 32 used in the SOS and flow velocity sensing arrays 24, 26 each include a plurality of optical fiber coils 32. Each coil 32 is wrapped one or more turns around the circumference of the pipe section 12 in a manner that allows the length of the optical fiber within the coil 32 to change in response to changes in the circumference of the pipe 12. If, for example, a pipe 12 can be expected to see a maximum circumferential change of "y", then a one-turn coil will be subject to a maximum potential change in length of "y" (or some known function of "y"). If an optical measurement technique is not sensitive enough to register a change in distance equal to "y", then the coil 32 can be wrapped to include "n" number of turns. The change in fiber length "y" per turn is therefore multiplied by "n" turns, and a change in fiber length great enough to produce a useful signal (i.e., "n·y") is provided. In fact, the same technique can be used to not only provide a minimum useful signal, but also to increase the sensitivity of the sensor 32 and therefore increase the range of detectable changes in the circumference of the pipe 12. In all cases, the length of the optical fiber in each coil 32 is known and is chosen to produce the sensitivity required to sense the disturbance(s) of interest for that particular sensor. The preferred embodiment, as described above, includes coils 32 wrapped around the circumference of the pipe 12. Alternatively, the optical fiber lengths can be arranged around a portion of the circumference of the pipe 12.

The turns of optical fiber in a sensor 32 are preferably laid next to one another to minimize the axial component of each turn, and thereby keep each turn to a known, constant length. Alternatively, some or all the turns of a coil 32 could be separated from adjacent turns. A coil 32 can consist of a single layer of optical fiber turns, or multiple layers of optical fiber turns depending on the application. The coil 32 of optical fiber in each sensor 32 may be attached to the pipe 12 by a variety of attachment mechanisms including, but not limited to, adhesive, glue, epoxy, or tape. In a preferred embodiment, a tape having an adhesive substance attached to opposite surfaces of a substrate is used. The tape adheres to both the pipe 12 and the fiber and provides a smooth surface on which the fiber can be laid. It is theorized that tape used on a rough surface helps to decrease micro-bend losses within the optical fiber.

In most embodiments, the optical pressure sensors 32 used in the SOS and flow velocity sensing arrays 24, 26 further include one or more optical reflective devices 46 disposed between coils 32 that are wavelength tunable. In a preferred embodiment, the optical reflective devices 46 are fiber Bragg gratings (FBGs). An FBG, as is known, reflects a predetermined wavelength band of light having a central peak reflection wavelength ($\lambda$b), and passes the remaining wavelengths of the incident light (within a predetermined wavelength range). Accordingly, input light propagates along the cable 30 to the coils 32 and the FBGs reflect particular wavelengths of light back along the cable 30. It is believed that in most applications there is advantage in placing an isolation pad between each optical reflective device 46 and the outer surface of the pipe to accommodate pipe growth and/or vibrations. U.S. patent application Ser. No. 09/726,060, entitled "Isolation Pad for Protecting Sensing Devices on the Outside of a Conduit," filed Nov. 29, 2000, discloses such an isolation pad and is hereby incorporated by reference.

In the embodiment of the present invention shown in FIG. 3, the sensors 32 are connected in series and a single FBG 46 is used between each of the sensor 32. In this embodiment, each FBG 46 has a common reflection wavelength $\lambda_1$. In the embodiment shown in FIG. 4, the sensors 32 are connected in series and pairs of FBGs 46 are located along the fiber at each end of each of the sensors 32. The FBG pairs 46, each of which constitute a unique reflection wavelength $\lambda_{1-4}$, are used to multiplex the sensed signals so that the return signals from each of the sensors 32 can be easily identified. Thus, the pair of FBGs 46 associated with the first sensor 32a has a common reflection wavelength $\lambda_1$, and the second pair of FBGs 46 associated with the second sensor 32b has a common reflection wavelength $\lambda_2$, which is different from that of the first pair of FBGs 46. Similarly, the FBGs 46 associated with the third sensor 32c have a common reflection wavelength $\lambda_3$, which is different from $\lambda_1, \lambda_2$, and the FBGs 46 associated with the fourth sensor 32d have a common reflection wavelength $\lambda_4$, which is different from $\lambda_1, \lambda_2, \lambda_3$. The sensors 32 within either sensing array 24, 26 may alternatively be connected to one another in parallel by using optical couplers (not shown) that are positioned upstream of each sensor 32 and coupled to a common fiber.

Referring to FIGS. 2, 3, and 4, the sensors 32 and accompanying FBGs 46 may be configured in numerous known ways to precisely measure the fiber length or change in fiber length, such as by interferometric, Fabry Perot, time-of-flight, or other known arrangements. An example of a Fabry Perot technique is described in U.S. Pat. No. 4,950,883, entitled "Fiber Optic Sensor Arrangement Having Reflective Gratings Responsive to Particular Wavelengths," to Glenn. Alternatively, a portion or all of the fiber between the optical reflective device 46 may be doped with a rare earth dopant (such as erbium) to create a tunable fiber laser, examples of which can be found in U.S. Pat. Nos. 5,317,576, 5,513,913, and 5,564,832, which are incorporated herein by reference.

Referring to FIG. 5, in an alternative embodiment, the sensors 32 may also be formed as a purely interferometric sensing array by using sensors 32 without FBGs 46 disposed therebetween. In this embodiment, each sensor 32 is independently connected to the instrumentation at the platform 20 and known interferometric techniques are used to determine the length or change in length of the fiber around the pipe 12 due to pressure variations within the pipe. U.S. Pat. No. 5,218,197, entitled "Method and Apparatus for the Non-invasive Measurement of Pressure Inside Pipes Using a Fiber Optic Interferometer Sensor," issued to Carroll, discloses such a technique. The interferometric wraps may also be multiplexed in a manner similar to that described in Dandridge et al., "Fiber Optic Sensors for Navy Applications," IEEE, February 1991, or Dandridge et al., "Multiplexed Interferometric Fiber Sensor Arrays," SPIE, Vol. 1586, 1991, pp.176–183. Other techniques to determine the change in fiber length may also be used. In addition, reference optical coils (not shown) may be used for certain interferometric approaches. Such reference coils may also be located on or around the pipe 12, but may be designed to be insensitive to pressure variations.

Adjacent sensors 32, within either sensing array 24, 26, are spaced apart from each another by a known distance or distances. The sensors 32 in an array are preferably equidistant from one another, but not necessarily. In both sensing arrays 24, 26, the spacing between adjacent sensors 32 and the number of sensors 32 reflect the nature of the signal being sensed. The SOS sensing array 24 detects acoustic signals having relatively long wavelengths, and the flow velocity sensing array 26 detects local pressure variations within the flow having relatively small coherence lengths. In relative terms, the sensors 32 in the SOS sensing array 24 are spaced apart from one another substantially further than the sensors 32 within the flow velocity sensing array 26 because of the intrinsic differences in the signals being sensed. The exact inter-spacing and number of coils 32 in sensing arrays 24, 26 is application dependent and is a function of parameters such as, but not limited to, the spectra of anticipated acoustic signals and local pressure variations, the anticipated SOS of the fluid constituents, the number of sensors 32, the processing technique used, etc. Examples of signal processing techniques can be found in the following references, which are incorporated herein by reference: H. Krim & M. Viberg, "Two Decades of Array Signal Processing Research—The Parametric Approach," IEEE Signal Processing Magazine, pp. 67–94; and R. Nielson, "Sonar Signal Processing," Ch. 2, pp. 51–59.

FIG. 2 shows an exemplary embodiment of the present invention flow meter 22 that can be inserted in-line within a production pipe 12 and disposed at an appropriate position within the well. The flow meter 22 includes a SOS sensing array 24 and a flow velocity sensing array 26 mounted on a section of pipe 12 adjacent one another and enclosed within a housing 28. A fiber optic cable 30 extends through one of the housing bosses 36 and connects to an optical delay line 48. An optical fiber 50, in turn, connects the optical delay line 48 to the SOS sensing device 24. The SOS sensing device 24 includes six (6) sensors 32 located at six predetermined locations ($x_1, x_2, x_3, x_4, x_5, x_6$) along the pipe 12, and each sensor 32 is separated from adjacent sensors 32 by an axial length of "$\Delta x$". As noted previously, each sensor 32 is mounted on a tape that includes adhesive on both faces.

A FBG 46 is positioned between the optical delay line 48 and the first sensor 32. One FBG 46 is also positioned between and connected to each pair of adjacent sensors 32, such that the optical delay line 48, the FBGs 46, and the sensors 32 in the SOS sensing array 24 are in series with one another. It is preferred, but not required, to skew each FBG 46 between the adjacent sensors 32 so as to minimize the sharpness of the directional changes of the fibers that comprise the sensors 32 or the fiber associated with the FBGs 46.

An optical fiber 52 extends from the last sensor 32 in the SOS sensing array 24 to a first sensor 32 in the adjacent flow velocity sensing array 26. A FBG 46 is disposed in-line between the two devices. The flow velocity sensing array 46 includes four (4) sensors 32 located at predetermined locations ($x_7, X_8, x_9, x_{10}$) along the pipe 12. Like the SOS sensing array 24, each sensor 32 in the flow velocity sensing array 26 is mounted on tape and is separated from adjacent sensors 32 by an axial length increment of "$\Delta x$". The axial distance $\Delta x$ separating the sensors 32 in the flow velocity sensing array 26 is, however, substantially shorter than that used in the SOS sensing array 24 because of the difference in the characteristics of the pressure disturbances sought to be measured. As noted previously, the SOS sensing array 24 senses relatively long wavelength acoustic signals traveling through the fluid flow at the speed of sound, while the flow velocity sensing array 26 senses relatively short coherence length local pressure variations with the fluid flow. One FBG 46 is positioned between and connected to each pair of adjacent sensors 32, such that the FBGs 46 and the sensors 32 in the flow velocity sensing array 26 are in series with one another. Here again, it is preferred to skew each FBG 46 between the adjacent sensors 32 so as to minimize sharp directional changes. In some applications, it may be useful to connect an additional optical delay line 48 after the last sensor 32 in the flow velocity sensing array 26.

In a version of the exemplary embodiment of the present invention flow meter 22 shown in FIG. 2, the optical delay line(s) 48 are formed by wrapping approximately two hundred and ten meters (210 m) of optical fiber around the circumference of a three and one-half inch (3.5") diameter pipe. Each coil of the SOS sensing array 24 is formed by wrapping one hundred and two meters (102 m) of optical fiber around the circumference of the pipe in a single layer. The optical fiber is wrapped using approximately twenty-five grams (25 g) of tension on the fiber. Each turn of the coil is separated from adjacent coils by a fifteen micron (15 $\mu$) gap. Adjacent coils in the SOS sensing array 24 are spaced approximately eighteen inches (18") apart, center to center. The velocity sensing array 26 is formed in like manner, except that each coil comprises seven layers rather than a single layer, and adjacent coils are spaced approximately one and eight tenths of an inch (1.8") apart, center to center. In both sensing devices, the FBGs are spliced in the section of optical fiber that extends in a helical fashion between adjacent coils, or between a coil and a delay line, etc. Each FBG and the splices that tie the FBG into the optical fiber are laid on an isolator pad, as previously noted.

The flowmeters as described herein above may be designed to accommodate a variety of pressure levels, slew rates, and pressure variations. For any given design, the practical limitations of the flowmeter will be determined by the ability of the fiber to accurately sense the structural response, or the time varying strain responses, of the pipe to the pressure fluctuations within the pipe. These limitations are determined by, among other things, the structural compliance of the pipe, optical timing issues for a given length of fiber, and slew rate limitations based on the rate of change of the length of the fiber sensors. As described above, it is desirable to select a fiber length per sensor and sensor spacing to provide an optimum level of gain for the full range of acoustics to be detected, and with regard to the fluid type, fluid consistency, and the anticipated flow rate of the fluid within the pipe. The method of interrogating the sensors of a given flowmeter depends on the fiber length and the practical constraints described herein. One such method of interrogation is set forth in U.S. patent application Ser. No. 09/726,059, entitled "Method and Apparatus for Interrogating Fiber Optic Sensors," filed Nov. 29 2000, the subject matter of which is incorporated herein by reference in its entirety.

The present invention provides the ability to selectively modify, or otherwise attenuate, the gain of a flowmeter while keeping other constraints constant. The present invention results in a flowmeter having a fixed fiber length with the capability to measure a wide range of pressure levels in various acoustic environments. It will be appreciated by those skilled in the art that the environment surrounding a flowmeter may produce too much acoustic energy and thereby overtax the highly sensitive fiber optic sensors. Such environments are those that include pumps, venturis, choke valves, or any other sources that causes noise orders of magnitude above that of normal pipe flow.

Figure 6:
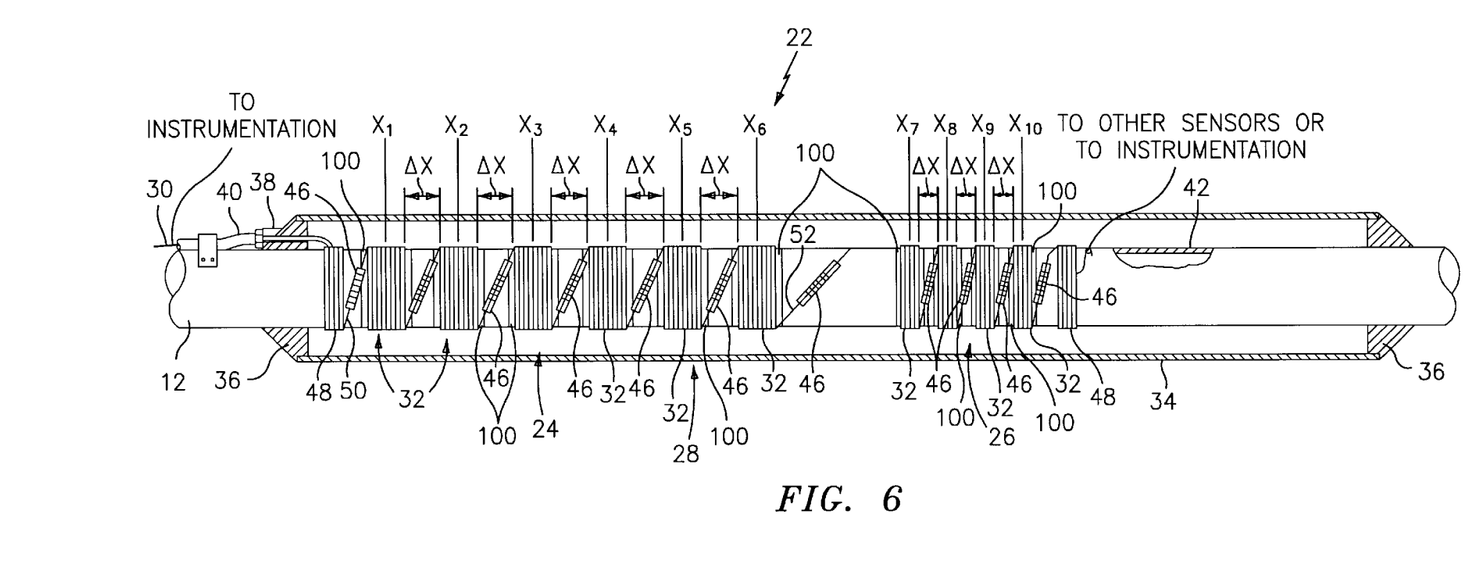
FIG. 6 is a diagrammatic view of an apparatus for non-intrusively measuring fluid flow parameters incorporating circumferential strain attenuators in accordance with the present invention within a pipe.

The flowmeter 22 shown in FIG. 2 depicts an embodiment wherein sensor wraps 32 are coupled directly, or closely, to the pipe 12. This configuration provides the highest level of gain or ability to sense the structural response of the pipe 12 to pressure fluctuations from fluids flowing therethrough. An embodiment of attenuators 100 of the present invention is best described with reference to FIGS. 6 and 7 wherein the various sensors 32 of flowmeter 22 are mounted to the attenuators. Attenuator 100 is an axisymmetrical ring or collar including a land 102 coupled directly to the outside diameter of the pipe 12. The land may be coupled by providing an interference fit, by welding or by other methods as described herein or by any other known method. Fiber 30 of sensor 32 may variously be positioned on land 102, mandrel 104, and web portion 106 as appropriate to obtain the desired level of attenuation.

Figure 7:
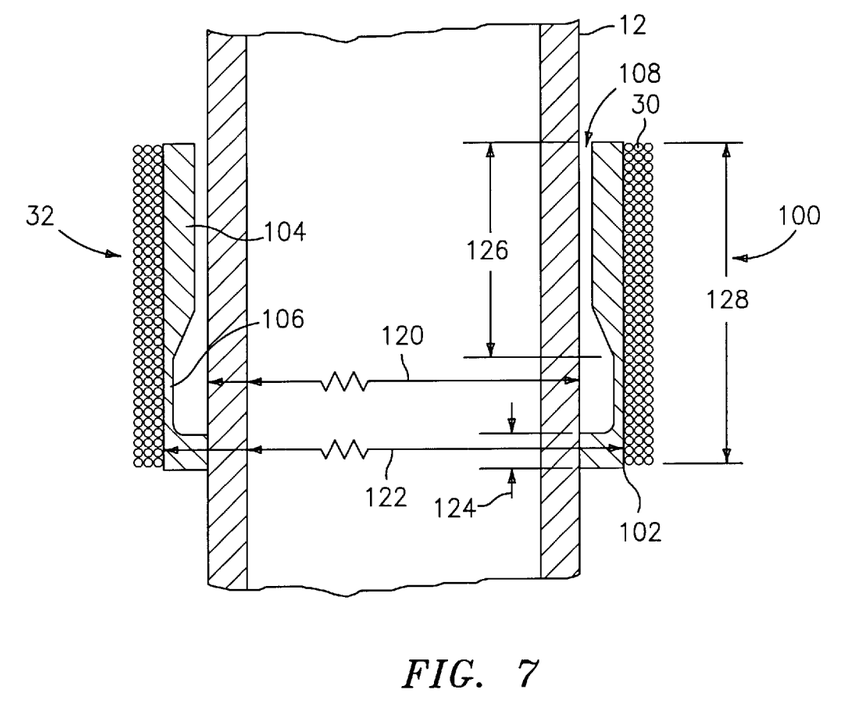
FIG. 7 is a cross-sectional side view of a circumferential strain attenuator in accordance with the present invention.

In operation, land 102 has a strain response similar to that of the pipe 12, but with a slightly stiffer cross-sectional effect. Because the web 106 and mandrel 104 are cantilevered from the pipe 12, a slight gap 108 is maintained therebetween providing these portions with an attenuated strain response relative to the pipe. The level of attenuation is primarily driven by the geometries selected for attenuator 100 and in the embodiment shown, web 106 is thin compared to the land 102 and the mandrel 104 and provides a low stress transition zone from the land to the mandrel. The mandrel 104 includes a thicker cross section than the web and possesses a higher hoop stiffness than web portion 106 and is able to resist the strain experienced by land 102 in response to pressure fluctuations within pipe 12. In the embodiment shown, mandrel 104 exhibits a small negative strain response relative to the pipe 12 and land 102 as a result of the relatively low bending stiffness of the web portion 106. In addition to providing a low stress transition zone from the land to the mandrel, the low bending stiffness of the web portion 106 can be sized to minimize the amount of negative strain imparted to the mandrel portion 104.

The attenuator 100 provides broad band attenuation of the strain response of the pipe without introducing additional dynamics between the strain in the pipe and the average strain in the fiber that would distort the relation between the attenuated strain and the actual strain response of the pipe. The broad band attenuation provided is essentially flat up to frequencies approaching the ring frequency mode of the attenuator (breathing mode) because of its inherent stiffness in all modes that have a circumferentially averaged strain component. The attenuator 100 will have non-axisymmetric modes, such as yaw, that occur at frequencies significantly below the ring frequency. These modes do not influence or otherwise degrade the transfer function because they do not contain a circumferentially averaged strain component and therefore are not observed by the sensor.

The level of attenuation provided by attenuator 100 is dependent upon many parameters including material type, coupling methods, the number of layers of fibers 30, and geometry of the attenuator including its various the lengths and thicknesses. In addition, the position of the sensor 32 along the various portions of the attenuator 100 will change the attenuation level for any given combination of parameters. The extent of attenuation may be determined by integrating the hoop strain over the entire length of the attenuator 100 and may be expressed in terms of the ratio of the strain response of the attenuator with the strain response of the pipe 12. Optical fibers 30 react to the various strain responses of the attenuator by producing a commensurate length change similar to that described herein above, resulting in a flowmeter 22 which provides attenuated signal responses when compared to a flowmeter having sensors 32 coupled directly to pipe 12.

The present invention will now be described with respect to specific embodiments with reference to FIGS. 7 and 8. In a particular embodiment, the attenuator 100 is comprised of a stainless steel material and has a nominal inside diameter 120 of the land portion 102 of 2.375 inches, an outside diameter 122 of 3.225 inches, and a length 124 of approximately 0.25 inches. The length 126 of mandrel portion 104 is nominally 2.0 inches long and includes a sensor 32 comprising a three-layer wrap of fibers 30 occupying a width 128 of approximately 1.664 inches.

Figure 8:
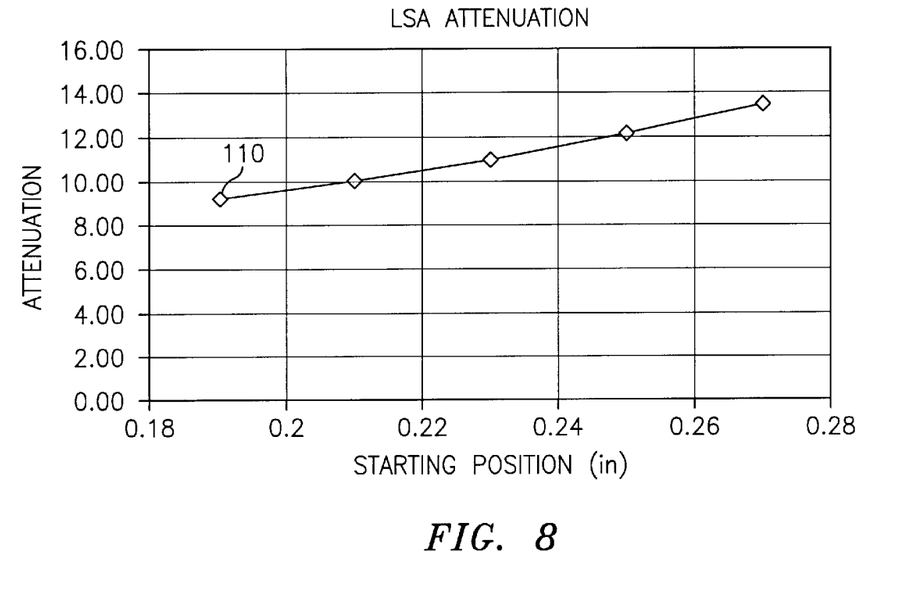
FIG. 8 is a graphical representation of the attenuation characteristics of an embodiment of the present invention.

With reference to FIG. 8, the level of attenuation for this particular embodiment is depicted graphically for sensor 32 having a 1.664 inch width mounted to mandrel portion 104 at different positions thereon from a starting position nearest the land 102 to a starting position near the end of the mandrel portion. As can be seen from the figure, the level of attenuation is dependent upon the starting position of the sensor 32 and increases as the sensor starting position moves away from the land 102 portion of the attenuator. The performance of the attenuator depicted in FIG. 8 is based on a nominal hoop strain response of pipe 12 of 0.096 microinch/in/psi and shows that a sensor 32 starting at a point 0.19 inches along mandrel 104 (point 110) has an attenuated strain response of approximately 0.0103 microinch/in/psi or an attenuation of 9.29. Similarly, a sensor 32 having starting points at 0.21, 0.23, 0.25 and 0.27 inches along mandrel 104 exhibits attenuation levels of 10.09, 11.03, 12.16 and 13.54 respectively.

Figure 9:
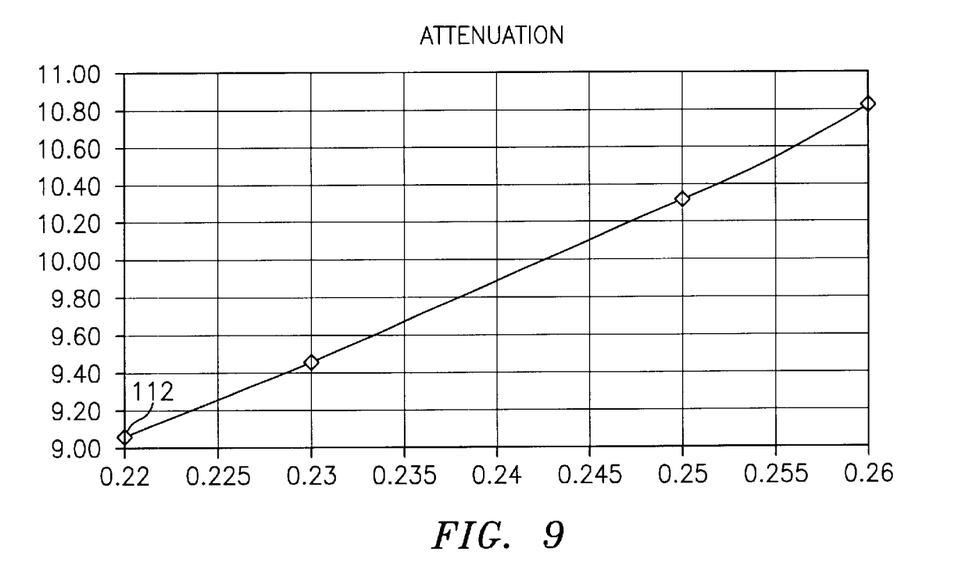
FIG. 9 is a graphical representation of the attenuation characteristics of an embodiment of the present invention.

An alternative embodiment of attenuator 100 is shown with reference to FIGS. 7 and 9 having different dimensions. This embodiment includes a nominal inside diameter 120 of the land portion 102 of 2.875 inches, an outside diameter 122 of 3.225 inches, and a width 124 of 0.25 inches long. The mandrel portion 104 has a length 126 of nominally 1.8 inches and includes a sensor 32 comprising a three-layer wrap of fibers 30 occupying a width 128 of approximately 1.414 inches.

Figure 10:
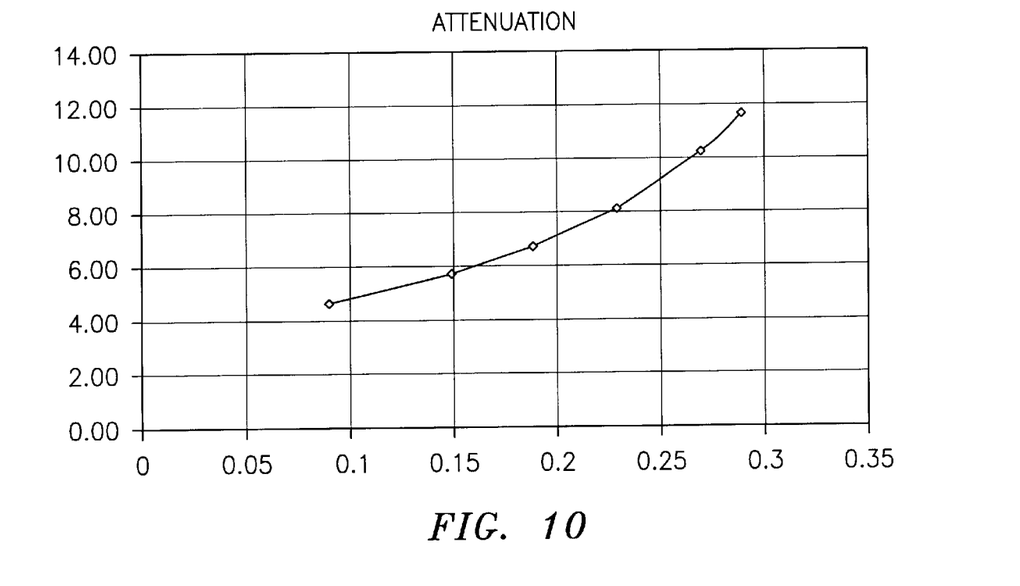
FIG. 10 is a graphical representation of the attenuation characteristics of an embodiment of the present invention.

The performance of the attenuator depicted in FIG. 9 is based on a nominal hoop strain response of pipe 12 of approximately 0.279 microinch/in/psi. Similar to that described herein above in FIG. 8, the sensor 32 starts at a point 0.22 inches along mandrel 104 (point 112) and has an attenuated strain response of approximately 0.0308 microinch/in/psi or an attenuation of 9.07. Similarly, a sensor 32 having starting points at 0.21, 0.23, 0.25 and 0.26 inches along mandrel 104 exhibits attenuation levels of 9.46, 10.33, and 10.88 respectively. Similarly, although not shown in the figure, a sensor 32 having starting points at 0.30 and 0.35 along mandrel 104 exhibits attenuation levels of 13.38 and 18.62 respectively. The performance of an attenuator similar to that described above having a mandrel length of 1.5 inches is depicted in FIG. 10, and shows a similar relationship between sensor starting point and attenuation level.

Figure 11:
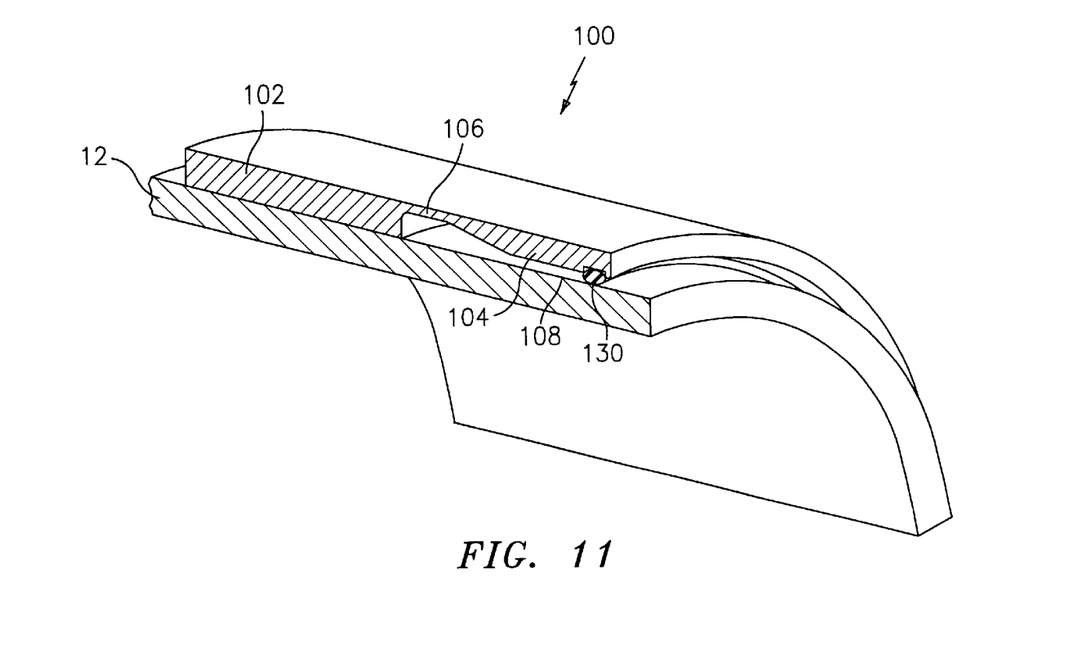
FIG. 11 is a perspective view in partial section of a circumferential strain attenuator in accordance with the present invention.

An alternative embodiment of attenuator 100 is shown with reference to FIG. 11 wherein the attenuator includes a circumferential groove 130 positioned on the inside diameter of mandrel portion 104 with an O-ring 132 positioned within the groove. O-ring 132 is sized such that it is compressed between attenuator 100 and the outside diameter of pipe 12 to provide a predetermined level of compression. In such a configuration, O-ring 132 provides a predictable level of damping of natural high frequency vibrational modes of the attenuator. In a particular embodiment, O-ring 132 is comprised of a nitrile or neoprene material and together with groove 130 is sized to provide a compression level of about 20%.

Figure 12:
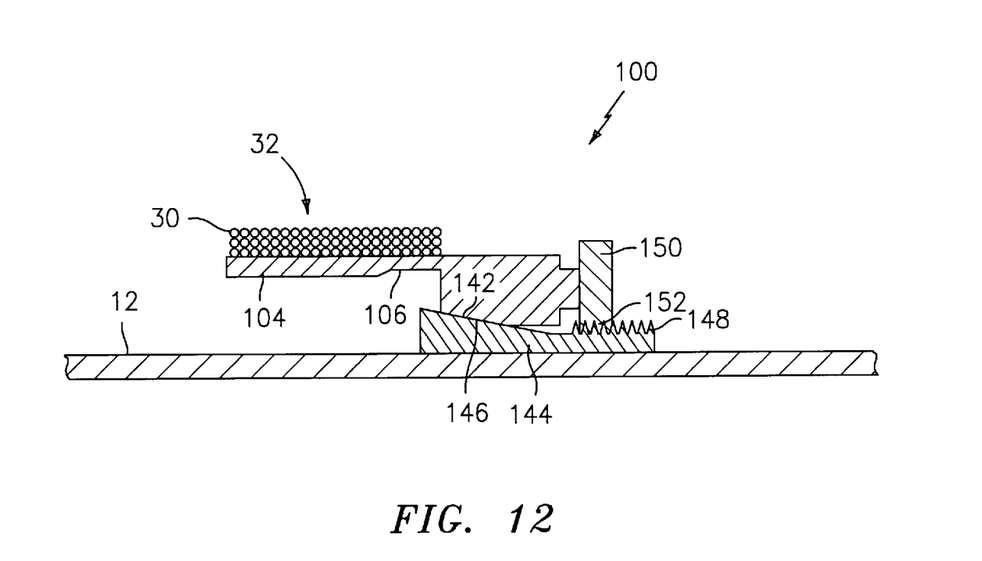
FIG. 12 is a cross-sectional side view of an alternative embodiment of the circumferential strain attenuator of the present invention.

Yet another alternative embodiment is shown with reference to FIG. 12 wherein attenuator 100 comprises an axisymmetrical attenuator ring 140 including mandrel 104 and web portion 106 and further comprises a ramp portion 142. Attenuator 100 further comprises a split ring 144, comprising two or more partial arc sections as is known, having a ramp portion 146 and an externally threaded potion 148. In operation, the sections of split ring 144 are assembled about pipe 12 and attenuator ring portion 140 is assembled over the split ring with ramp 142 cooperating with ramp 146 to provide a force to wedge the split ring and attenuator ring together. Attenuator 100 further includes nut 150 having internal threads 152 which cooperate with the external threads 148 on split ring 144. When engaged and tightened, nut 150 forces intimate contact between ramps 142, 146 and between split ring 144 and pipe 12, thus providing a land portion similar to that described herein above. This particular embodiment is particularly advantageous because it facilitates mounting the attenuator on a pipe where other methods are difficult or not possible.

Although the invention has been described and illustrated with respect to exemplary embodiments thereof, the foregoing and various other additions and omissions may be made therein and thereto without departing from the spirit and scope of the present invention.

What is claimed is:

1. An apparatus for attenuating the gain of a sensor used to sense the strain response of a pipe having an axis, comprising:
   a land coupled to the pipe and extending radially therefrom;
   a web extending from the land parallel to the axis of the pipe, wherein the web has a smaller cross sectional area than the land;
   a mandrel extending from the web parallel to the axis of the pipe, wherein the mandrel forms a gap with respect to the pipe; and
   a sensor coupled at least to the mandrel.

2. The apparatus of claim 1, wherein the web is thinner than the mandrel.

3. The apparatus of claim 1, wherein the land, web, or mandrel are annular.

4. The apparatus of claim 3, wherein the land, web, and mandrel are annular.

5. The apparatus of claim 4, wherein the land, web, and mandrel are concentric about pipe axis.

6. The apparatus of claim 5, wherein the land, web and mandrel have outside diameters that are equidistant from the pipe axis.

7. The apparatus of claim 6, wherein the outside diameters form a mounting surface for the sensor.

8. The apparatus of claim 1, wherein the sensor comprises a fiber optic sensor.

9. The apparatus of claim 8, wherein the fiber optic sensor comprises a winding of fiber optic cable wound around the mounting surface.

10. The apparatus of claim 4, further comprising a circumferential groove on an inside diameter of the mandrel, and an O-ring disposed between the groove and the pipe.

11. The apparatus of claim 1, wherein the land comprises:
    a first wedge having first threads coupled to the pipe; and
    a second wedge coupled to a nut having, second threads, wherein the second wedge is coupled to the web,
    wherein coupling the first and second threads wedges the first wedge and second wedge into contact.

12. The apparatus of claim 11, wherein the first wedge comprises a split ring comprising a plurality of partial circumferential arc sections.

13. The apparatus of claim 1, wherein the land, web, and mandrel define a mounting surface, wherein the sensor comprises a fiber optic sensor, and wherein the sensor is coupled to at least a portion of the mounting surface.

14. The apparatus of claim 13, wherein the fiber optic sensor comprises a winding of fiber optic cable wound around the mounting surface.

15. The apparatus of claim 13, wherein the attenuation of the sensor varies depending on the axial position of the fiber optic cable on the mounting surface.

16. The apparatus of claim 13, further comprising tape coupled between the fiber optic cable and the external surface.

17. The apparatus of claim 13, wherein the web is thinner than the mandrel.

18. The apparatus of claim 13, wherein the mounting surface is annular.

19. The apparatus of claim 18, wherein the mounting surface is concentric about pipe axis.

20. The apparatus of claim 19, wherein the mounting surface comprises a uniform diameter.

21. The apparatus of claim 13, further comprising a circumferential groove on an inside diameter of the mandrel, and an O-ring disposed between the groove and the pipe.

22. An apparatus for attenuating the gain of a sensor used to sense the strain response of a pipe having an axis, comprising:
    a land coupled to the pipe and extending radially therefrom;
    a web extending from the land parallel to the axis of the pipe;
    a mandrel extending from the web parallel to the axis of the pipe, wherein the mandrel forms a gap with respect to the pipe, and wherein the mandrel is thicker than the web; and
    a sensor coupled at least to the mandrel.

23. The apparatus of claim 22, wherein the web has a smaller cross sectional area than the land.

24. The apparatus of claim 22, wherein the land, web, or mandrel are annular.

25. The apparatus of claim 24, wherein the land, web, and mandrel are annular.

26. The apparatus of claim 25, wherein the land, web, and mandrel are concentric about pipe axis.

27. The apparatus of claim 26, wherein the land, web and mandrel have outside diameters that are equidistant from the pipe axis.

28. The apparatus of claim 27, wherein the outside diameters form a mounting surface for the sensor.

29. The apparatus of claim 22, wherein the sensor comprises a fiber optic sensor.

30. The apparatus of claim 29, wherein the fiber optic sensor comprises a winding of fiber optic cable wound around the mounting surface.

31. The apparatus of claim 25, further comprising a circumferential groove on an inside diameter of the mandrel, and an O-ring disposed between the groove and the pipe.

32. The apparatus of claim 22, wherein the land comprises:
a first wedge having first threads coupled to the pipe; and
a second wedge coupled to a nut having second threads, wherein the second wedge is coupled to the web,
wherein coupling the first and second threads wedges the first wedge and second wedge into contact.

33. The apparatus of claim 32, wherein the first wedge comprises a split ring comprising a plurality of partial circumferential arc sections.

34. The apparatus of claim 22, wherein the land, web, and mandrel define a mounting surface, wherein the sensor comprises a fiber optic sensor, and wherein the sensor is coupled to at least a portion of the mounting surface.

35. The apparatus of claim 34, wherein the fiber optic sensor comprises a winding of fiber optic cable wound around the mounting surface.

36. The apparatus of claim 34, wherein the attenuation of the sensor varies depending on the axial position of the fiber optic cable on the mounting surface.

37. The apparatus of claim 34, further comprising tape coupled between the fiber optic cable and the external surface.

38. The apparatus of claim 34, wherein the web has a smaller cross sectional area than the land.

39. The apparatus of claim 34, wherein the mounting surface is annular.

40. The apparatus of claim 39, wherein the mounting surface is concentric about pipe axis.

41. The apparatus of claim 40, wherein the mounting surface comprises a uniform diameter.

42. The apparatus of claim 34, further comprising a circumferential groove on an inside diameter of the mandrel, and an O-ring disposed between the groove and the pipe.

* * * * *